United States Patent [19]
Kogure

[11] Patent Number: 5,411,068
[45] Date of Patent: May 2, 1995

[54] PNEUMATIC RADIAL TIRE WITH REDUCED TREAD WEIGHT

[75] Inventor: Tomohiko Kogure, Hiratsuka, Japan

[73] Assignee: The Yokohama Rubber Co., Ltd., Tokyo, Japan

[21] Appl. No.: 76,744

[22] Filed: Jun. 15, 1993

[30] Foreign Application Priority Data

Aug. 27, 1992 [JP] Japan .................. 4-228580

[51] Int. Cl.$^6$ .................. B60C 11/00; B60C 15/06
[52] U.S. Cl. .................. 152/209 R; 152/454;
152/525; 152/526; 152/527; 152/542; 152/543;
152/546; 152/555
[58] Field of Search .......... 152/209, 525, 539, 541,
152/542, 543, 546, 555, 526–527, 454

[56] References Cited

U.S. PATENT DOCUMENTS

| | | | |
|---|---|---|---|
| 3,638,705 | 2/1972 | Devienne et al. | 152/542 |
| 4,096,899 | 6/1978 | Kitazawa et al. | 152/546 |
| 4,357,976 | 11/1982 | Mezzanotte et al. | 152/555 |
| 4,815,511 | 3/1989 | Brayer et al. | 152/209 R |
| 5,147,477 | 9/1992 | Mouri et al. | 152/209 R |

FOREIGN PATENT DOCUMENTS

| | | | |
|---|---|---|---|
| 3313854 | 10/1984 | Germany | 152/542 |
| 57-70708 | 5/1982 | Japan | 152/555 |
| 59-38104 | 3/1984 | Japan | 152/546 |
| 3-204314 | 9/1991 | Japan | 152/539 |
| 4-66309 | 3/1992 | Japan | 152/542 |

*Primary Examiner*—Adrienne Johnstone
*Attorney, Agent, or Firm*—Nikaido, Marmelstein, Murray & Oram

[57] ABSTRACT

A pneumatic radial tire in which a tread weight $\alpha$ per unit ground contact area is selected to be not greater than $1.80 \times 10^{-3}$ kg/cm$^2$, a cord reinforcing ply which extends up to a location outside of a top end of a bead filler in a radial direction of the tire is disposed in a bead portion and a cord angle $\theta$ of the cord reinforcing ply relative to a circumferential direction of the tire is selected to be 25°–80°, a height RH of the cord reinforcing ply from a rim base up to the top end of the cord reinforcing ply, which is measured in the radial direction of the tire, is selected to satisfy the ratio, RH/SH=0.28–0.65, with SH being a cross-sectional height of the tire, and a height FH of the bead filler from the rim base up to the top end of the bead filler, which is measured in the radial direction of the tire, is selected to satisfy the ratio, FH/SH=0.11–0.28, with SH being the cross-sectional height of the tire.

5 Claims, 2 Drawing Sheets

PNEUMATIC RADIAL TIRE WITH REDUCED TREAD WEIGHT

BACKGROUND OF THE INVENTION

The present invention relates to a pneumatic radial tire which makes it possible to reduce the weight of a tire without worsening road noise and steering stability.

To preserve the natural environment of the earth, a reduction in the fuel consumption of an automobile is strongly demanded, and a reduction in the weight of a pneumatic radial tire is requested as one method for reducing the fuel consumption. One means useful in reducing the weight of the pneumatic radial tire is to reduce the amount of rubber of a tread in which the amount of rubber used is the largest in the entire tire structure.

However, in the case of a conventional tire, if the amount of the tread rubber is merely reduced, the weight of a crown portion is reduced to increase the natural frequency of the conventional tire which is approximately 90 Hz. As a result, road noise of relatively low frequency band of 80–125 Hz increases, which is transmitted from a road surface to the inside of a vehicle via the tire. Furthermore, since a vibration damping effect lowers as a result of the reduction in the amount of the tread rubber, there has been the problem that road noise becomes still worse.

To prevent the road noise from being worsened by the reduction in the amount of the tread rubber, it is necessary to minimize the increase in the natural frequency of the tire of approximately 90 Hz. One method for reducing the natural frequency of the tire is to lower the vertical rigidity of a side wall portion (casing rigidity) by altering the portions of the tire structure other than the tread. However, if the casing rigidity is lowered, the steering stability becomes worse. In other words, an improvement in steering stability and a reduction in road noise are incompatible, antinomic relationship.

SUMMARY OF THE INVENTION

An object of the present invention is to provide a pneumatic radial tire which makes it possible to reduce the weight of a tire by reducing the amount of tread rubber without worsening either of road noise and steering stability.

To achieve the above object, according to the present invention, there is provided a pneumatic radial tire in which a tread weight $\alpha$ per unit ground contact area is selected to be not greater than $1.80 \times 10^{-3}$ kg/cm$^2$, a cord reinforcing ply which extends up to a location outside of the top end of a bead filler in a radial direction of the tire is disposed in a bead portion and a cord angle $\theta$ of the cord reinforcing ply relative to a circumferential direction of the tire is selected to be 25°–80°, a height RH of the cord reinforcing ply from a rim base up to the top end of the cord reinforcing ply, which is measured in the radial direction of the tire, is selected to satisfy the ratio, RH/SH=0.28–0.65, with SH being a cross-sectional height of the tire, and a height FH of the bead filler from the rim base up to the top end of the bead filler, which is measured in the radial direction of the tire, is selected to satisfy the ratio, FH/SH=0.11–0.28, with SH being the cross-sectional height of the tire.

As described above, since the tread weight $\alpha$ per unit ground contact area is selected to be not greater than $1.80 \times 10^{-3}$ kg/cm$^2$, it is possible to reduce a tire weight compared to a conventional tire of the same tire size. Even if the amount of the tread rubber is reduced, it is possible to reduce the vertical rigidity of a side wall portion by setting the height FH of the bead filler to a remarkably small value to satisfy FH/SH=0.11–0.38. Accordingly, it is possible to suppress an increase in, or lower, the natural frequency of a tire which is generally approximately 90 Hz, and it is possible to avoid occurrence of a resonance with a comparatively low frequency vibration of 80–125 Hz, whereby it is possible to suppress an increase in, or lower, road noise. Also, since the cord reinforcing ply whose cord angle $\theta$ is 25°–80° and whose height RH satisfies the ratio, RH/SH=0.28–0.65 (SH being the cross-sectional height of the tire) is disposed in the bead portion, it is possible to increase the circumferential rigidity of the tire without substantially increasing the vertical rigidity of the side wall portion, so that it is possible to suppress the lowering of the steering stability.

In the present invention, the tread weight $\alpha$ per unit ground contact area is calculated as $\alpha = M/(D \times \pi \times T)$ kg/cm$^2$ from a tread weight M and a tread development width T, which will be defined later, as well as a tire outer diameter D provided by a standard rim and a standard air pressure.

The tread weight M and the tread development width T are defined as shown in FIG. 2. Let a point A be a point of intersection between a curve R which extends along a tread face into the outside of its shoulder and a curve S which extends along a buttress portion into the outside of its shoulder, a length which extends along the tread face between two points of intersection A and A which are obtained on the opposite shoulder portions of the tire is called the tread development width T.

Let a point B be a point which is spaced apart from the point of intersection A on the surface of the buttress portion by a distance of $0.2 \times T$ in the radial direction of the tire, the tread weight M is defined as the weight of a tread formed around the entire circumference of the tire, which tread is defined by lines L—L which are extended from the respective points B at right angles to the surfaces of the relative buttress portions.

DETAILED DESCRIPTION OF THE PREFERRED EMBODIMENTS

Figure 1:
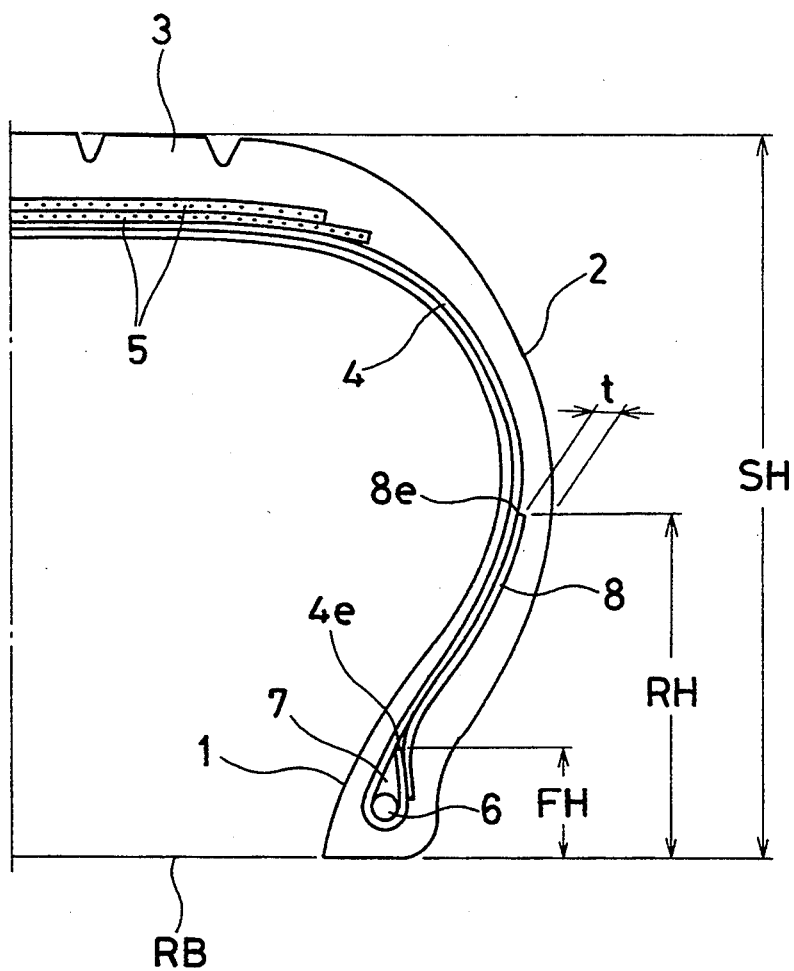
FIG. 1 is a diagrammatic, cross-sectional view of one half of a pneumatic radial tire according to one embodiment of the present invention.
Figure 2:
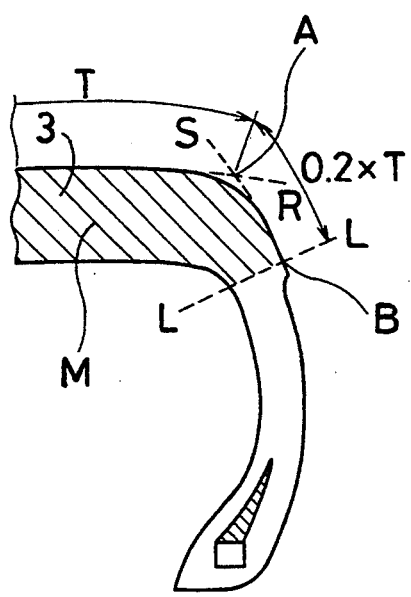
FIG. 2 is a schematic view which serves to explain the definition of a tread weight $\alpha$ (kg/cm$^2$) of a tread per unit ground contact area.

The radial tire shown in FIG. 1 includes a bead portion 1, a side wall portion 2, a tread 3, a carcass ply 4 and belt plies 5. The carcass ply 4 is disposed at a cord angle of substantially 90° with respect to the circumferential direction of the tire. The carcass ply 4 is folded back around a bead core 6 of the bead portion 1 from the inside to the outside of the tire in such a manner as to wrap around a bead filler 7, and the folded-back end portion 4e of the carcass ply 4 is extended upward so that an end 4e reaches a location above the bead filler 7 on the outside thereof. A cord reinforcing ply 8 is disposed to cover the end 4e on the outside of the folded-back carcass ply 4. A top end 8e of the cord reinforcing ply 8 extends to a location spaced apart from the bead filler 7 toward the outside in the radial direction of the tire. The belt plies 5 are provided as two plies, and the belt plies 5 cross each other at a cord angle of 5°–40° with respect to the circumferential direction of the tire.

According to the present invention, in the above-described radial tire, the previously-described tread weight $\alpha$ per unit ground contact area is selected to be not greater than $1.80 \times 10^{-3}$ kg/cm$^2$. As the value of the tread weight $\alpha$ is made smaller, the weight of the tire can be made lighter. However, if the value of the tread weight $\alpha$ is excessively small, a balance to proper tire characteristics will be lost. For this reason, it is desirable that the lower limit value of the tread weight $\alpha$ be selected to be $\alpha = 1.3 \times 10^{-3}$ kg/cm$^2$.

In one arrangement for reducing the tread weight $\alpha$ per unit ground contact area, it is desirable to reduce the amount of tread rubber. In another arrangement in which a reinforcing cord used in each of the belt plies 5 is, for example, a steel cord, it is desirable to reduce the number of wires per cord, and a cord structure is desirably formed as, for example, "2+2", "1×4", 1×2" or a single wire. Otherwise, an organic fiber cord, such as an aramid cord, may be used.

Although the groove depth of each primary groove is made smaller by reducing the amount of tread rubber, the groove depth is desirably selected to be 6–8 mm, preferably, 6.5–7.5 mm. The decrease in groove depth due to the reduction in the amount of tread rubber leads to a reduction in the thickness of the tread 3, whereby the response characteristics of a steering wheel is improved so that steering stability is improved. Accordingly, it is desirable to reduce the tread weight $\alpha$ by reducing the groove depth within the above-described range.

If the tread weight $\alpha$ per unit ground contact area is reduced in the above-described manner, road noise will become worse as long as no countermeasure is taken. If the size of the bead filler is reduced as a road-noise countermeasure, casing rigidity becomes excessively low to lower the steering stability. To cope with this problem, the present inventor noted that, to make road noise characteristics compatible with the steering stability while reducing the tread weight $\alpha$, it is desirable that the vertical rigidity of the side wall portion be reduced to improve road noise characteristics and, at the same time, the circumferential rigidity of the tire which acts in the circumferential direction thereof be increased to maintain the steering stability.

Further, after conducting various experiments, the present inventor found that, to simultaneously achieve a reduction in the vertical rigidity of the side wall portion and an increase in the circumferential rigidity, it is desirable to reduce the size of the bead filler and use the cord reinforcing ply along with the bead filler of reduced size, as well as to make the height of the cord reinforcing ply greater than that of the bead filler and set the cord angle relative to the circumferential direction of the tire to a smaller value (make the position of the cord reinforcing ply closer to the circumferential portion of the tire). In other words, according to the aforesaid finding, if the height of the cord reinforcing ply is increased and the cord angle relative to the circumferential direction of the tire is reduced, it is possible to remarkably increase the circumferential rigidity of the tire in spite of a small increase in the vertical rigidity of the side wall portion. On the other hand, it was found that a reduction in the size of the bead filler (a reduction in the height of the bead filler) remarkably increases the effect of reducing the vertical rigidity of the side wall portion compared to the effect of reducing the circumferential rigidity of the side wall portion.

According to the present invention, on the basis of the aforesaid findings, particularly to increase the circumferential rigidity of the side wall portion while suppressing an increase in the vertical rigidity of the side wall portion, a height RH of the cord reinforcing ply from a rim base RB is selected to satisfy the ratio, RH/SH=0.28–0.65 (SH being a cross-sectional height of the tire) (refer to FIG. 1), and the cord angle $\theta$ relative to the circumferential direction of the tire is selected to be 25°–80°. More preferably, the height RH of the cord reinforcing ply is set to satisfy the ratio, RH/SH=0.40–0.50, and the cord angle $\theta$ is set to 30°–60°.

If the height RH of the cord reinforcing ply is such that RH/SH is smaller than 0.28 or if the cord angle $\theta$ is greater than 80°, the effect of increasing the circumferential rigidity of the side wall portion becomes insufficient and it becomes difficult to maintain the steering stability at a satisfactory level. On the other hand, if the height RH of the cord reinforcing ply is such that RH/SH is greater than 0.65, separation of the end portion of the cord reinforcing ply from rubber will easily take place. If the cord angle $\theta$ is made smaller than 25°, the forming workability of a green tire lowers and productivity worsens. Regarding the cord angle e, if the cord reinforcing ply is brought excessively close to the circumferential direction of the tire, separation of the cord reinforcing ply easily occurs at the end portion.

The cord reinforcing ply is preferably made as one ply, but may be made from a plurality of plies. Although the cord reinforcing ply is disposed along the bead filler, the position of the cord reinforcing ply may be selected from the inside or outside of the bead filler. As a material of the reinforcing cord, it is possible to use either an organic fiber cord, such as a nylon cord and an aramid cord, or a steel cord.

A height FH of the bead filler from the rim base RB to the top end thereof, which is measured in the radial direction of the tire, is reduced to satisfy the ratio, FH/SH=0.11–0.28 with SH being cross-sectional height of the tire, thereby reducing the vertical rigidity (refer to FIG. 1.). By reducing this FH/SH to 0.28 or less, it is possible to suppress an increase in, or lower, road noise. However, if the height FH of the bead filler is made excessively small, it is impossible to embed the bead filler in the inner side of the folded-back portion of the carcass ply when the carcass ply is folded back around a bead core. For this reason, FH/SH is selected to be greater than or equal to 0.11.

As the bead filler, it is desirable to use a bead filler having a JIS hardness of 75–95, preferably, 75–90.

In the present invention, if a thickness t of the side wall portion is increased, the vertical rigidity increases and an increase in natural frequency is caused. For this reason, it is desirable that the thickness t of the side wall portion be made as small as possible as long as its resistance to external physical damage is not impaired, to further suppress or reduce road noise. The thickness t of the axially outer rubber measured at a location corresponding to the top end 8e of the cord reinforcing ply is to be selected to be 1.0–2.5 mm, preferably, 1.5–2.0 mm.

According to the present invention, by selecting the tread weight $\alpha$ per unit ground contact area to be not greater than $1.80 \times 10^{-3}$ kg/cm$^2$, it is possible to greatly reduce the weight of the tire compared to conventional tires of the same tire size. Furthermore, since the bead filler is reduced in size while the amount of tread rubber is reduced, it is possible to reduce the vertical rigidity of the side wall portion while suppressing an increase in, or lowering, road noise. In addition, the cord reinforcing ply is disposed in the bead portion 1 and its cord angle is selected to be 25°-80°, and the height RH of the cord reinforcing ply is selected to be a specific one which exceeds the height of the top end of the bead filler. Accordingly, it is possible to increase the circumferential rigidity without substantially increasing the vertical rigidity of the side wall portion, so that it is possible to suppress the deterioration of the steering stability. Accordingly, it is possible to reduce the weight of the tire without worsening the road noise and the steering stability.

EXAMPLES

Conditions (a) to (f) of Paragraph (1) described below were used as conditions common to all tire examples to be prepared, and conditions (a) to (d) of Paragraph (2) described below were used as variable conditions for the individual tire examples. On the basis of the conditions, the fifteen kinds of tires shown in Table 1 were prepared, which included a conventional tire, inventive tires 1 to 11 and comparative tires 1 to 3.

Each of the fifteen kinds of tires had the following structure. The conventional tire had a structure, such as that shown in FIG. 1, in which no cord reinforcing ply was provided. In contrast, the inventive tires 1 to 11 and the comparative tires 1 to 3 had the structure shown in FIG. 1, and the amount of tread rubber of each of the tires was reduced compared to the conventional tire, whereby the tread weight $\alpha$ per unit ground contact area was reduced. The rubber thickness t of the side wall portion was 3.5 mm in the case of the conventional tire, and 1.6 mm in the case of each of the inventive tires 1 to 11 and each of the comparative tires 1 to 3.

(1) COMMON CONDITIONS:
 (a) tire size: 175/70R13
 (b) tire outer diameter D: 57.8 cm
 (c) tread development width T: 14.0 cm
 (d) structure of belt ply: two plies (upper ply of 120 mm and lower ply of 130 mm; the two plies cross each other at a cord angle of 21° relative to the circumferential direction of the tire.)
 (e) rubber hardness of side wall: JIS-A 60
 (f) rubber hardness of bead filler: JIS-A 90

(2) VARIABLE CONDITIONS:
 (a) tread weight $\alpha$:
  conventional tire: $1.86 \times 10^{-3}$ kg/cm$^2$
  inventive tires 1-8, 10, 11 and
  comparative tires 1-3: $1.70 \times 10^{-3}$ kg/cm$^2$
  inventive tire 9: $1.40 \times 10^{-3}$ kg/cm$^2$
 (b) cord material and end count of belt ply:
  conventional tire, inventive tires 1-8, 10, 11, and comparative tires 1-3:
   steel cord of 1×5 (0.25), 40 ends/50 mm
  inventive tire 9:
   aramid fiber cord of 1500D/2, 45 ends/50 mm
 (c) cord material of cord reinforcing ply:
  inventive tires 1-9 and comparative tires 1-3:
   nylon fiber cord of 840D/2
  inventive tire 10:
   aramid fiber cord of 1500D/2
  inventive tire 11:
   steel cord of 1×5 (0.25)
 (d) height of bead filler (FH, FH/SH), height of cord reinforcing ply (RH, RH/SH) and cord angle $\theta$ of cord reinforcing ply:
  as shown in Table 1 for each tire.

The road noise and the steering stability of each of the fifteen kinds of tires were measured by the following measurement method. The result is shown in Table 1.

ROAD NOISE:

A tire was mounted to a rim of 13×5J and filled with air at a pneumatic pressure of 200 kPa (2.0 kgf/cm$^2$). The wheels thus prepared were attached to a front engine front wheel drive (FF) type of vehicle of 1600 cc displacement, and while the vehicle was running on a rough road surface at a speed of 50 km/h, the sound pressure level (dB) of road noise of frequency band 80-125 Hz was measured in the vehicle room at a position corresponding to the height of a driver's ear on the side of the driver's seat closer to a door window. The smaller the measured value, the smaller road noise.

STEERING STABILITY:

A tire was mounted to a rim identical to that used in the road noise test and filled with air at the same pneumatic pressure, and the wheels thus prepared were attached to an identical type of vehicle. Evaluation was performed on the basis of an average speed at which the vehicle was running on a slalom test road on which pylons were disposed at intervals of 30 m. The evaluation was performed by using the reciprocal of a measured value (average speed), and in Table 1 the evaluation result is represented by an index which takes the reciprocal of the average speed of the conventional tire as a reference (100). The greater the value of the index, the higher the steering stability.

TABLE 1

|  | $\alpha \times 10^{-3}$ (kg/cm$^3$) | FH (mm) | FH/SH | RH (mm) | RH/SH | $\theta$ (°) | road noise (dB) | Steering stability (index) | remark |
|---|---|---|---|---|---|---|---|---|---|
| conventional tire | 1.86 | 42.0 | 0.34 | — | — | — | 62.9 | 100 | |
| inventive tire 1 | 1.70 | 25.0 | 0.20 | 62.0 | 0.50 | 55 | 62.8 | 101 | |
| inventive tire 2 | 1.70 | 35.0 | 0.28 | 62.0 | 0.50 | 55 | 62.9 | 101 | |
| comparative tire 1 | 1.70 | 37.0 | 0.30 | 62.0 | 0.50 | 55 | 63.1 | 102 | |
| inventive tire 3 | 1.70 | 25.0 | 0.20 | 35.0 | 0.28 | 55 | 62.7 | 99 | |
| inventive tire 4 | 1.70 | 25.0 | 0.20 | 37.0 | 0.30 | 55 | 62.8 | 100 | |
| inventive tire 5 | 1.70 | 25.0 | 0.20 | 81.0 | 0.65 | 55 | 62.9 | 102 | |
| comparative tire 2 | 1.70 | 25.0 | 0.20 | 83.0 | 0.67 | 55 | 62.9 | 103 | note 1 |
| comparative tire 3 | 1.70 | 25.0 | 0.20 | 62.0 | 0.50 | 20 | 62.8 | 102 | note 2 |
| inventive tire 6 | 1.70 | 25.0 | 0.20 | 62.0 | 0.50 | 25 | 62.8 | 102 | |
| inventive tire 7 | 1.70 | 25.0 | 0.20 | 62.0 | 0.50 | 75 | 62.8 | 100 | |
| inventive tire 8 | 1.70 | 25.0 | 0.20 | 62.0 | 0.50 | 80 | 62.8 | 99 | |
| inventive tire 9 | 1.40 | 14.0 | 0.11 | 81.0 | 0.65 | 70 | 62.9 | 100 | |
| inventive tire 10 | 1.70 | 25.0 | 0.20 | 62.0 | 0.50 | 55 | 62.8 | 102 | |

TABLE 1-continued

|  | $\alpha \times 10^{-3}$ (kg/cm$^3$) | FH (mm) | FH/SH | RH (mm) | RH/SH | $\theta$ (°) | road noise (dB) | Steering stability (index) | remark |
| --- | --- | --- | --- | --- | --- | --- | --- | --- | --- |
| inventive tire 11 | 1.70 | 25.0 | 0.20 | 62.0 | 0.50 | 30 | 62.9 | 103 | |

In Table 1, note 1 and note 2: Separation has occurred at the top end of the cord reinforcing ply.

As can be seen from Table 1, as in the case of the inventive tires 1-8, if the tread weight $\alpha$ per unit ground contact area is greatly reduced compared to the conventional tire, whereas the height (RH/SH) and the cord angle $\theta$ of the cord reinforcing ply and the height (FH/SH) of the bead filler are each selected from the prescribed range according to the present invention, it is possible to make a reduction in road noise compatible with the steering stability without worsening either of them.

However, as in the case of the comparative tire 1, if the height (FH/EH) of the bead filler is excessively large, road noise becomes worse and it becomes impossible to make a reduction in road noise compatible with the steering stability.

As in the case of the comparative tire 2, if the height (RE/SH) of the cord reinforcing ply exceeds the upper limit of the prescribed range according to the present invention, it is possible to make a reduction in road noise compatible with the steering stability, but separation occurs at the top end of the cord reinforcing ply and durability lowers.

As in the case of the comparative tire 3, if the cord angle $\theta$ is smaller than the lower limit of the prescribed range according to the present invention, although both road noise and steering stability do not worsen, separation occurs at the top end of the cord reinforcing ply and durability lowers.

The inventive tire 9 is an example in which an aramid fiber cord is used for the belt plies and the tread weight $\alpha$ per unit ground contact is reduced to a smaller value of $1.40 \times 10^{-3}$ kg/cm$^2$. This example demonstrates that as long as the height of the bead filler, the height of the cord reinforcing ply and the cord angle $\theta$ are each kept within the prescribed range according to present invention, it is possible to make a reduction in road noise compatible with the steering stability without worsening either of them.

Each of the inventive tires 10 and 11 demonstrates that even if the cord reinforcing ply is formed from an aramid fiber cord or a steel cord, as long as the prescribed ranges according to the present invention are satisfied, it is possible to make a reduction in road noise compatible with the steering stability without worsening either of them.

What is claimed is:

1. A pneumatic radial tire having a belt ply layer made of steel cords, wherein a tread weight $\alpha$ per unit ground contact area is not greater than $1.80 \times 10^{-3}$ kg/cm$^2$; a depth of a groove provided in a surface of a tread is 6-8 mm; a single cord reinforcing ply which extends up to a location outside of the top end of a bead filler in a radial direction of the tire, is disposed in each of a pair of bead portions and a cord angle $\theta$ of the cord reinforcing ply relative to a circumferential direction of the tire is 25°-80°; a height RH of the cord reinforcing ply from a rim base up to the top end of the cord reinforcing ply, which is measured in the radial direction of the tire, satisfies the ratio, RH/SH=0.28-0.65, with SH being a cross-sectional height of the tire; and a height FH of the bead filler from the rim base up to the top end of the bead filler, which is measured in the radial direction of the tire, satisfies the ratio FH/SH=0.11-0.28, with SH being the cross-sectional height of the tire.

2. A pneumatic radial tire according to claim 1, wherein the tread weight $\alpha$ per unit ground contact area is $1.30 \times 10^{-3}$ to $1.80 \times 10^{-3}$ kg/cm$^2$.

3. A pneumatic radial tire according to claim 1, wherein the cord angle $\theta$ of the cord reinforcing ply relative to the circumferential direction of the tire is 30°-60° and the aforesaid RH/SH is 0.40-0.50.

4. A pneumatic radial tire according to claim 1, wherein a thickness of axially outer rubber of a side wall portion at a location corresponding to the top end of the cord reinforcing ply is 1.0-2.5 mm.

5. A pneumatic radial tire according to claim 1, wherein a JIS hardness of the bead filler at normal temperature is 75-95.

* * * * *